_United States Patent Office_  3,475,215
Patented Oct. 28, 1969

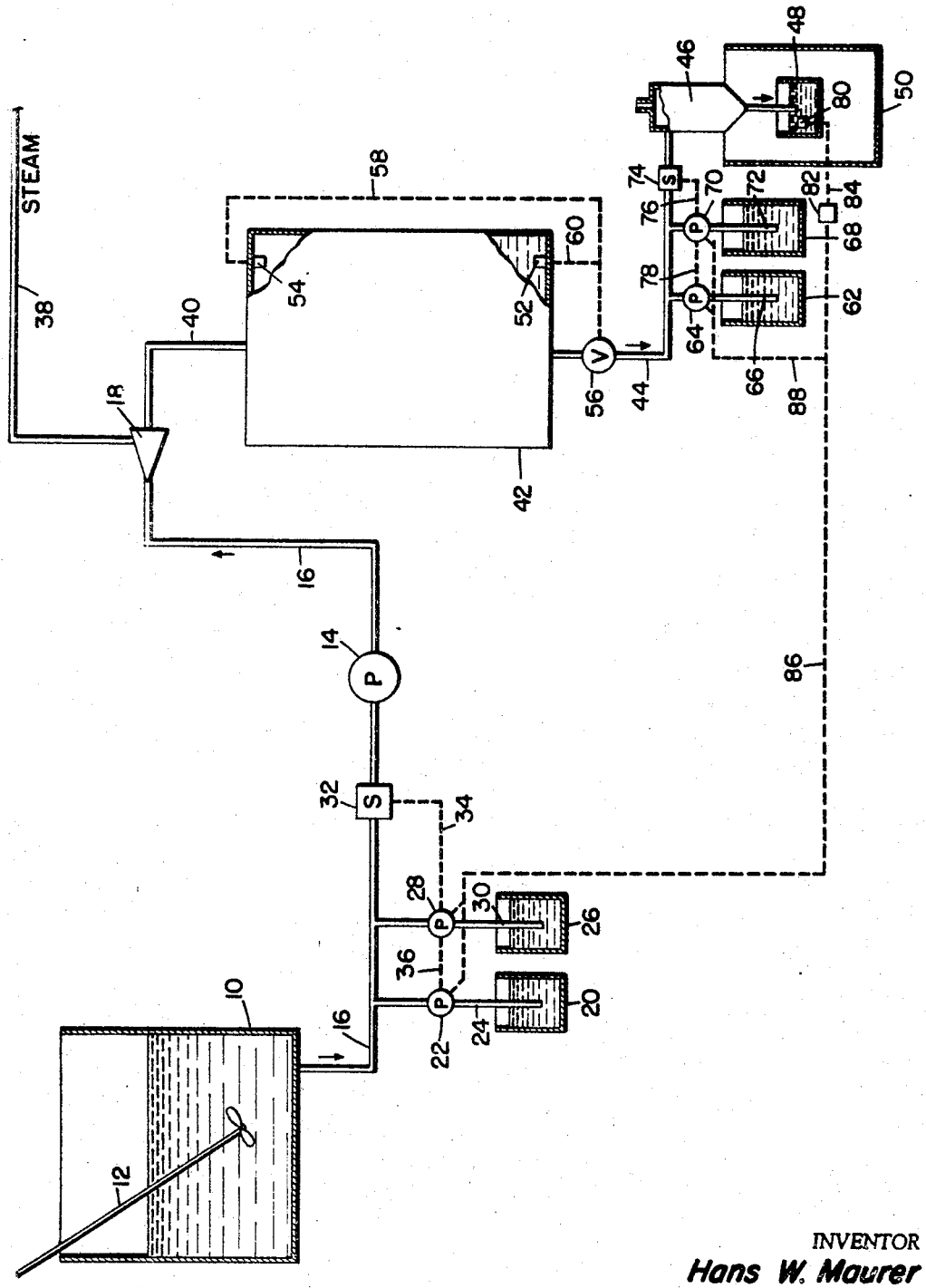

3,475,215
CONTINUOUS PROCESS FOR THE SIMULTANEOUS ACID HYDROLYSIS AND OXIDATION OF STARCH FOR USE IN COATING COMPOSITIONS
Hans W. Maurer, Beltsville, Md., assignor to West Virginia Pulp and Paper Company, New York, N.Y., a corporation of Delaware
Filed Mar. 14, 1967, Ser. No. 623,132
Int. Cl. D21h 1/24; C13l 1/08
U.S. Cl. 127—36         24 Claims

ABSTRACT OF THE DISCLOSURE

Process for the continuous and simultaneous acid hydrolysis and oxidation of starch which includes forming an aqueous slurry of starch, adding an oxidizing agent and an acid hydrolysis catalyst to the slurry, heating the slurry above the gelatinization temperature of starch while subjecting the gelatinized starch to the combined effects of acid hydrolysis and oxidation, and flowing the converted starch to a receiving zone.

BRIEF SUMMARY OF THE INVENTION

This invention relates to the treatment of starch to render it more suitable for use as an adhesive in coating compositions for paper and the like. More particularly, this invention relates to a process in which the viscosity of a cooked native starch is reduced by a combined acid hydrolysis and oxidation of the starch when the latter is in a pasted or gelatinized state.

In general, starch employed as an adhesive in a coating composition is usually modified by one of several methods, such as enzymatic degradation, acid hydrolysis, oxidation, or dextrinization. Each such process has its own merits and deficiencies, but each is successful to some degree in producing a starch of reduced viscosity for use in coatings. In many instances, the above processes are performed on starch in its granular state by the starch manufacturer. Such commercially modified starches, which must be reslurried and pasted or gelatinized at the paper mill, command a relatively high price compared to that of raw or pearl starch. Accordingly, a native starch modification process, which can be employed at the mill site and which utilizes the starch while it is in a pasted state, has long been sought to avoid the cost of commercially modified starches. Since starch is used in its pasted state, the economics favor its reaction and modification while in a pasted state.

Processes for the oxidation of starch is an alkaline environment, as for example that set forth in U.S. Patent 3,211,564, are known. While such processes have found utility in the paper industry, they are not without attendant problems. For example, such processes utilize large amounts of oxidant and buffer when a high solids starch slurry is converted, and a colored product, due to the chemicals used, often results. If the cooking time is reduced to avoid color problems, then retrogradation of the converted material becomes a problem. Some of these problems are partly overcome by cooking the starch in the presence of a pigment dispersion, but cooling of the converted product by heat exchange then becomes difficult due to the high viscosity of the combined starch and pigment. Further, if starch is cooled in the presence of pigment, additional buffer must be provided to prevent the pH from becoming so acidic as to coagulate the pigment.

Other known modification processes occur at a pH of 4 or below and are too acidic in nature to provide a starch with sufficient adhesive strength. For example, starches modified only by acid hydrolysis, such as when treated with hydrochloric acid, generally have less adhesive strength than oxidized starches because random hydrolysis of the starch occurs, producing sugars which have little adhesive qualities.

In the present invention, the above-mentioned problems are overcome by combining the reactions of acid hydrolysis and oxidation in one continuous process to produce an acid-oxidized starch with excellent adhesive properties. This is accomplished by reacting starch in the gelatinized state with an acid hydrolysis catalyst, such as aluminum chloride, and an oxidizing agent, such as hydrogen peroxide, the reaction mixture having a pH of between 4 and 5 before the starch is gelatininzed. In general, a starch and water suspension is agitated and continuously moved to and through a continuous starch cooker. En route to the cooker, the acid hydrolysis catalyst and the oxidizing agent are added to the starch slurry. The starch slurry, and modification reactants, are heated in the starch cooker above the gelatinization temperature of the starch. The acid hydrolysis catalyst is activated by thermal decomposition, and simultaneous acid hydrolysis and oxidation of the pasted or gelatinized starch is initiated in the cooker. The reaction mixture is then continuously passed to a reaction tank where the hydrolysis and oxidation reactions continue to the desired degree. From the reaction tank, the starch mixture is continuously moved to a flash chamber, then into an overflow device, and finally is passed into a receiving tank.

In practice, the starch has been pasted at temperatures ranging from about 250° F. to about 320° F., which temperatures are well above the gelatinization range of starches used in the paper industry. The temperature of the starch in the reaction tank has remained substantially the same as the temperature of the starch in the cooker. The total time for the continuous process, measured from entrance into the cooker to exit from the flash chamber, has varied from about 1 to 10 minutes.

Starch cookers of known type have been employed for purposes of the novel process. Cookers, in which live steam is injected into the starch slurry, such as that shown in my U.S. Patent 3,219,483, have been found most useful. Other types of continuous starch cookers, which operate with indirect heating techniques, can also be employed.

The starch to be converted is preferably a pearl starch, and the starch is preferably corn starch. However, any starch capable of being modified as to viscosity and which is useable in paper coating compositions can be used in practicing this invention. Starch slurries, having a solids content of up to about 43 percent, have been utilized in the present invention, and the solids content of the converted starch has run as high as about 35 percent.

The acid hydrolysis catalyst is preferably an acid salt in which the cation is compact, i.e., the action has a crystalline ionic radius of no greater than about 1 angstrom. Suitable acid hydrolysis catalysts include aluminum chloride, aluminum bromide, aluminum nitrate, aluminum sulfate, magnesium chloride, and calcium chloride. The amount of hydrolysis catalyst used is small compared to the total solids of the starch slurry. In practice, amounts of acid hydrolysis catalyst up to about .3%, based on the weight of dry starch, have been used effectively.

The oxidizing agent is selected to be dispersible in an aqueous, acidic starch slurry and should preferably be soluble in water under these conditions. Suitable oxidizing agents include hydrogen peroxide in its free state as a solution in water or in a dry state bound to an inorganic salt, such as perborates, percarbonates, persilicates, and persulfates, or bound to organic materials, such as urea. Quantities of oxidizing agent up to about .5%, based on the weight of dry starch, have been employed.

While it has not been conclusively proven, it is believed that the oxidizing agent, under the temperature and pH conditions of the present process, disassociates into hydroxyl free radicals which react with the hydroxy groups of the starch molecule to yield an oxidized starch. This free radical oxidation mechanism is quite unlike that which is generally believed to occur in an alkaline oxidation in which peroxide ions are generated. It is to be noted that the hydrolysis reaction which occurs in the present process does not promote oxidation, but it too effects viscosity reduction. However, care must be taken in selecting the acid hydrolysis catalyst, to avoid use of a catalyst which gives a low pH and supports random hydrolysis down to sugars, as can occur if hydrochloric acid is employed.

In the preferred embodiment of the invention, masking agents are added to the cooked and reacted starch to stabilize the converted starch paste and to reduce the tendency for retrogradation. Suitable masking agents include inorganic phosphates, silicates, borates and citrates, such as those salts of sodium, and organic masking agents, such as ethylenediaminetetraacetate. These masking agents neutralize the cation of the acid hydrolysis catalyst by forming precipitates or soluble complexes, thereby preventing the cation from combining with starch and causing retrogradation or precipitation of starch, especially amylose molecules. It is to be noted that the tendency toward retrogradation is reduced by virtue of the acid-oxidation process since oxidized starch molecules carry a negative charge, and the molecules tend to repel each other. However, the use of masking agents reduces retrogradation to an even greater extent.

Sufficient water-soluble alkali, such as ammonium hydroxide, is provided after the masking agent addition, if any, to adjust and raise the pH of the final starch product. The starch product is then in a suitable condition for use as the adhesive in a paper coating composition, and it can be combined with the pigment for a paper coating composition, thereby reducing the temperature of the pasted starch for application purposes.

The acid hydrolysis and oxidation reactions are substantially complete when the starch leaves the reaction tank and no significant decreases in viscosity occur thereafter, indicating that the reactants have been depleted. If the oxidizing agent is not sufficiently depleted, a reducing agent, such as a sulfite or bisulfite, can be added with the neutralization agent, or certain metal ions, such as copper, can be added in a separate addition, after the starch leaves the reaction tank.

BRIEF DESCRIPTION OF THE DRAWING

The accompanying drawing is a diagrammatic illustration of apparatus which can be employed to practice the continuous process of this invention.

DETAILED DESCRIPTION

The invention will be best understood by reference to the drawing and to the following illustrative examples.

Example 1

Sufficient amounts of pearl corn starch and water were introduced into slurry tank 10 and were mixed by agitator 12 to provide a 35% solids content starch slurry. Delivery pump 14, preferably a positive displacement pump, moved the starch slurry through conduit 16 from slurry tank 10 to the continuous starch cooker 18, preferably of the types shown in my U.S. Patent 3,219,483, at a flow rate of about one-half gallon per minute. En route to the cooker 18, additions of acid hydrolysis catalyst and oxidizing agent were made to the starch slurry. A 10 percent solution of aluminum chloride was provided in the acid hydrolysis catalyst supply container 20. The aluminum chloride solution was moved by metering pump 22 through conduit 24 from container 20 to the starch slurry in conduit 16. The aluminum chloride was supplied to the starch slurry at a rate of .075% dry aluminum chloride based on the weight of dry starch. A 3 percent solution of hydrogen peroxide was provided in the oxidizing agent supply container 26. The peroxide solution was moved by metering pump 28 through conduit 30 from container 26 to the starch slurry in conduit 16. The hydrogen peroxide was supplied to the starch slurry at a rate of .2% dry hydrogen peroxide based on the weight of dry starch. The pH of the starch slurry after the additions of the acid hydrolysis and oxidation reactants was about 4.23.

Conduit 16 was also provided with an electromagnetic flow switch 32 which initiated or stopped the operation of metering pumps 22 and 28 in known manner. When delivery pump 14 was operating, switch 32 activated metering pumps 22 and 28 via the control system indicated generally by dotted lines 34 and 36. When the delivery pump 14 was inactive, switch 32 shut down the operation of metering pumps 22 and 28.

The starch slurry, with the acid hydrolysis catalyst and oxidizing agent, was passed into starch cooker 18. Steam was fed from a suitable source through steam line 38 into the starch cooker 18. In the cooker 18, live steam was injected directly into the slurry, raising the temperature of the starch slurry to about 300° F., to paste the starch. The pasted starch and reactants passed from cooker 18 through conduit 40 to reaction tank 42 where the simultaneous acid hydrolysis and oxidation reactions continued.

The pasted and reacted starch mixture then moved from reaction tank 42 through conduit 44 to flash chamber 46 where the starch mixture was flashed to the atmosphere before being received in overflow container 48. The time, measured from cooker 18 to exit of the starch from chamber 46, was about 2 minutes. The starch product gathered in overflow container 48 until the container was full, and then the overflowing starch product was collected in storage tank 50. The viscosity of the converted starch in storage tank 50, at 32% solids, was 35 B.U. (Brabender units) at 95° C., increased to 60 B.U. at 50° C., and was 285 B.U. after the paste had been cooled to 27.5° C. and held at that temperature for about one hour. The starch paste was suitable for use as the adhesive in a paper coating composition.

Flow of the pasted starch from reaction tank 42 was controlled by differential pressure indicator 52–54, of known type, which controlled the opening and closing of discharge valve 56 by way of the control circuit indicated by dotted lines 58 and 60. If the amount of pasted starch in tank 42 dropped and caused the pressure reading to drop below a preset level, discharge valve 56 was closed. When the amount of starch in tank 42 increased and caused the pressure reading to rise to the preset level, discharge valve 56 was opened.

En route to flash chamber 46, additions of a masking agent and of a neutralization agent were made to the pasted starch. A 10 percent solution of ethylenediaminetetraacetate (EDTA) was provided in the masking agent supply container 62. The EDTA solution was moved by metering pump 64 through conduit 66 from container 62 to conduit 44. The EDTA was supplied to the pasted starch mixture at a rate of about 0.1% dry EDTA based on the weight of dry starch. A 10 percent solution of ammonium hydroxide was provided in the neutralization agent supply container 68. The ammonium hydroxide solution was moved by metering pump 70 through conduit 72 from container 68 to conduit 44. The ammonium hydroxide was supplied to the pasted starch mixture at a rate of about 0.25% dry ammonium hydroxide based on the weight of dry starch. The pH of the pasted starch mixture after the additions of the masking and neutralization agents was about 6.73.

Conduit 44 was also provided with an electromagnetic flow switch 74 which initiated or stopped the operation of metering pumps 64 and 70 via a control system indicated generally by dotted lines 76 and 78. The operation of the switch 74 and pumps 64 and 70 was similar to that described above in connection with switch 32 and pumps 22 and 28.

For automatic viscosity control and adjustment, the sensing head 80 of a recording and controlling viscometer 82 was placed in overflow container 48. The viscometer 82 was of known type generated either an electrical or preferably a pneumatic signal as the result of the difference in pressures exerted on a diaphragm by the flowing starch product. In case of difference between the desired and actual viscosities of the converted starch, a signal was generated by the viscometer and was transmitted by the control circuits indicated by dotted lines 84 and 86 to metering pumps 22 and/or 28. If the viscosity of the converted starch in overflow container 48 was higher than desired, the speeds of the metering pumps 22 and 28 were gradually increased to add more of the converting agents (oxidizing agent and acid hydrolysis catalyst) to the starch in line 16 and thereby effect a reduction in the viscosity of the converted starch. If the viscosity of the converted starch was lower than desired, the speeds of the metering pumps were decreased to add less of the converting agents to the starch in line 16 and thereby effect an increase in the viscosity of the converted starch.

For maintaining pH and viscosity stability of the converted product, an interlock control circuit 88 was provided which activated metering pumps 64 and/or 70 in a fashion similar to the above with respect to metering pumps 22 and 28.

Control circuits connecting the viscometer 82 with valve 56 have also been used to control the flow of pasted starch from reaction tank 42 in response to viscosity measurements, to thereby provide longer or shorter retention times in tank 42 and effect, respectively, a decreased or increased viscosity of the final starch product. Similarly, control circuits connecting the viscometer 82 with a valve in steam line 38 have been provided to increase or decrease conversion temperature and pressure by the addition of more or less steam to cooker 18. An increase in decreased viscosity of the final starch product and vice versa.

Example 2

The process as described in Example 1 above was repeated except that aluminum nitrate was employed as the acid hydrolysis catalyst, and sodium citrate was used as the masking agent. Aluminum nitrate was supplied at a rate of 0.11% based on the weight of dry starch. The pH of the starch slurry after addition of aluminum nitrate and hydrogen peroxide was about 4.23. The cooking conditions and throughput times remained the same as in Example 1. Sodium citrate was supplied to the pasted starch at a rate of 0.1% based on the weight of dry starch, and the pH of the pasted starch after addition of the sodium citrate and neutralizing agent was about 6.23. The viscosity of the starch paste, at 32% solids, in storage tank 48 was about 40 B.U. at 95° C., increased to 58 B.U. at 50° C., and was 400 B.U. after the paste had been cooled to 27.5° C. and held at that temperature for about one hour. The starch paste was suitable for use as the adhesive in a paper coating composition.

Examples 3–5

Several tests were carried out to demonstrate the effects of pH and masking agent addition on retrogradation of the final starch paste when aluminum chloride was used as the acid hydrolysis catalyst. In Example 3, aluminum chloride was the only starch reactant used and the final starch paste was not treated with a neutralization agent or a masking agent. In Example 5, aluminum chloride and hydrogen peroxide were employed as the starch reactants, with no subsequent addition of neutralization or masking agents. In Example 5, aluminum chloride and hydrogen peroxide were used as starch reactants, and the cooked starch was neutralized with ammonium hydroxide. In Examples 3–5, starch slurries of about 35% solids content were modified under the same cooking conditions, flow rates, and holding times as set forth in Examples 1, with the following results:

| Conditions | Example 3 | Example 4 | Example 5 |
|---|---|---|---|
| Percent $AlCl_3$ on dry starch | .05 | .05 | .075 |
| Percent $H_2O_2$ on dry starch | 0 | .2 | .2 |
| Neutralization | No | No | Yes |
| Percent $NH_4OH$ on dry starch | 0 | 0 | .25 |
| pH of slurry after addition of reactants | 4.38 | 4.38 | 4.2 |
| pH of paste after neutralization | 4.1 | 3.4 | 6.7 |
| Viscosity, B.U., at 95° C. (32% solids) | 100 | 60 | 35 |
| Viscosity, B.U., at 50° C. (32% solids) | 1,000 | 100 | 75 |
| Viscosity, B.U., after one hour at 27.5° C. (32% solids) | 71,750 | 620 | 480 |

From the above, it can be seen that retrogradation was greatest when the starch was modified only by acid hydrolysis. The starch paste of Example 3 was not suitable for used as the adhesive in a paper coating composition due to its high viscosity and great tendency for retrogradation. The acid hydrolyzed and oxidized starch paste of Example 4 was suitable for use as an adhesive, but it had a greater tendency toward retrogradation than the neutralized starch paste of Example 5. It should be noted that in the preferred process described in Example 1, a masking agent was employed and the final viscosity at 27.5° C. was about 200 units lower than that of Example 5. The use of a masking agent is preferred because of its stabilizing effect on viscosity, but it can be seen from Examples 4 and 5 that neither neutralization nor use of a masking agent is essential in the present process in order to produce a satisfactory starch paste for use as the adhesive in a coating composition.

Examples 6–7

Additional tests were carried out to further demonstrate the effects of pH and masking agent addition on starch retrogradation, when aluminum nitrate was employed as the acid hydrolysis catalyst. In Examples 6 and 7, starch slurrries of 35% solids content were modified under the same cooking conditions, flow rates, and holding times as set forth in Example 1, with the following results:

| Conditions | Example 6 | Example 7 |
|---|---|---|
| Percent $Al(NO_3)_3$ on dry starch | .1 | .1 |
| Percent $H_2O_2$ on dry starch | 0 | .2 |
| pH of slurry after addition of reactants | 4.32 | 4.35 |
| pH of paste after neutralization | 3.65 | 3.5 |
| Viscosity, B.U., at 95° C. (32% solids) | 100 | 65 |
| Viscosity, B.U., at 50° C. (32% solids) | 1,020 | 135 |
| Viscosity, B.U., after one hour at 27.5° C. (32% solids) | 71,750 | 1,050 |

From the above, it can be seen that retrogradation was greatest when the starch was modified only by acid hydrolysis. When comparing the viscosities of the pastes of Examples 6 and 7 with that of Example 2, where a masking agent and a neutralization agent were employed, it is noted that the final viscosity in Example 2 at 27.5° C. was about 650 units lower than that of Example 7, and was much lower than that of Example 6.

From Examples 1–7, it can be seen that the acid hydrolyzed-oxidized starch does not retrograde to the extent of acid hydrolyzed starches, even if neutralization and the use of masking agent are not employed. Thus, the combined acid hydrolysis-oxidation mechanisms produce starch molecules which have a reduced tendency to reassociate after modification, as compared to acid hydrolyzed starches.

Example 8

To demonstrate the commercial feasibility and utility of the process of this invention, starch paste was produced in a mill trial employing the type of apparatus described above in connection with Example 1.

A starch slurry of about 34% solids content was modified, in accordance with the process shown in FIGURE 1, by the addition of hydrogen peroxide at the rate of about .1% based on the weight of dry starch, and the addition of aluminum chloride at the rate of about .15% based on the weight of dry starch. The pasting temperature in the starch cooker was about 275° F. and the time, measured from the entrance of the starch into the cooker to exit of the paste from the flash chamber, was about 4 minutes. Ammonium hydroxide was added as neutralization agent at the rate of about .132% based on the weight of dry starch. The pH of the pasted starch mixture after addition of the neutralization agent was about 8.5. The viscosity of the starch paste was about 3000 centipoises (Brookfield, at 20 r.p.m.) at a temperature of about 140° F.

The starch paste was employed as the adhesive in an aqueous paper coating composition comprising, by weight, 100 parts clay, 3 parts latex, and 17.2 parts of the modified starch (dry basis). The solids content of the aqueous coating was 59.5%, and the Brookfield viscosity of the coating was about 2350 centipoises at a temperature of about 100° F. The coating was applied by a conventional trailing blade coater at a coat weight of about 10.7 pounds per ream (500 sheets, 25 x 38 inches) to paper having a basis weight of about 29 pounds per ream. After drying of the coating and supercalendering of the coated paper at 2 nips with a pressure loading of 1600 p.l.i., the coated paper had a Dennison wax pick value of 6.5. The commercial grade of paper, against which the mill trial paper was graded, employed a commercially modified starch and exhibited a wax pick value of 6.0. Thus, the starch pastes produced by the present invention find great utility in the papermaking industry by replacing expensive commercially modified starches with no loss in quality.

In the foregoing examples, starch slurries with solids contents up to about 35% have been used to illustrate the present process. Starch slurries with solids contents up to about 43% have been employed satisfactorily in this process. The final starch pastes have varied in solids content up to about 35%, since some dilution of the starch occurs due to condensation of steam in the continuous starch cooker. It is obvious that starch slurries with varying solids contents up to about 43% can be employed in this process, and many successful runs with starch slurries having a solids content as low as 8% have been conducted.

Of the aluminum salts used as acid hydrolysis catalysts, such as aluminum chloride, aluminum bromide, aluminum nitrate, and aluminum sulfate, the viscosity reducing efficiency of aluminum chloride was greatest. When equal amounts of catalysts were employed, the tendency for retrogradation was less when aluminum nitrate or aluminum bromide was used.

Of the masking agents employed, sodium citrate reduced retrogradation more than sodium phosphate, ethylenediaminetetraacetate, or sodium hydroxide. However, any chelating or masking agent, which reduces starch retrogradation in the pH range of about 4 to 5, may be used.

Various changes may be made in the examples specifically set forth above without departing from the spirit of this invention or the scope of the appended claims.

I claim:

1. The continuous process of modifying starch for use in paper coating compositions which comprises the steps of:
   (a) forming an aqueous slurry containing starch and water,
   (b) adding to the aqueous slurry an acid hydrolysis catalyst and an oxidizing agent, said oxidizing agent comprising hydrogen peroxide,
   (c) passing the aqueous slurry into a starch cooker,
   (d) heating the aqueous slurry in the starch cooker to a temperature above the gelatinization temperature of the starch, to paste the starch and activate the acid hydrolysis catalyst,
   (e) passing the pasted starch to a reaction vessel and subjecting the pasted starch to the combined viscosity reducing actions of the acid hydrolysis catalyst and the oxidizing agent,
   (f) and passing the acid hydrolyzed and oxidized starch paste to a receiving zone.

2. The process of claim 1 in which the time involved during steps (c) to (f) is about 1 and 10 minutes.

3. The process of claim 1 in which the axidizing agent is dispersible in an aqueous, acidic starch slurry.

4. The process of claim 1 in which the hydrogen peroxide is in a free state as a solution in water.

5. The process of claim 1 in which the hydrogen peroxide is in a dry state bound to an inorganic salt selected from the group consisting of perborates, percarbonates, persilicates, and persulfates.

6. The process of claim 1 in which the hydrogen peroxide is in a dry state in the form of an organic peroxide.

7. The process of claim 1 which further includes between steps (e) and (f) the step of adding a masking agent to the pasted starch, to reduce retrogradation of the pasted starch.

8. The process of claim 7 which further includes the steps of adding to the pasted starch, after the masking agent, a neutralization agent, to raise the pH of the pasted starch to about 7.

9. The process of claim 7 in which the masking agent is an inorganic compound selected from the group consisting of phosphates, silicates, borates, and citrates.

10. The process of claim 7 in which the masking agent is ethylenediaminetetraacetate.

11. The process of claim 1 in which the acid hydrolysis catalyst is an inorganic acid salt in which the cation has a crystalline ionic radius of up to about 1 angstrom unit.

12. The process of claim 11 in which the inorganic acid salt is a salt of aluminum.

13. The process of claim 12 in which the aluminum salt is aluminum chloride.

14. The process of claim 12 in which the aluminum salt is aluminum nitrate.

15. The process of claim 1 in which the aqueous starch slurry contains up to about 43% starch by weight.

16. The process of claim 15 in which in step (b) thereof the acid hydrolysis catalyst and oxidizing agent are separately and continuously added in metered amounts to the aqueous starch slurry.

17. The process of claim 16 in which the acid hydrolysis catalyst is added at a rate to provide up to about .3% of the catalyst based on the weight of dry starch in the aqueous slurry, and the oxidizing agent is added at a rate to provide up to about .5% of the oxidizing agent based on the weight of dry starch in the aqueous slurry.

18. The process of claim 17 in which the pH of the aqueous starch slurry after addition to the acid hydrolysis catalyst and oxidizing agent is between about 4 and 5.

19. The process of claim 18 in which the starch slurry is heated in the continuous starch cooker to a temperature between about 250° F. and 320° F.

20. A continuous acid hydrolysis and oxidation process for modifying starch for use in paper coating compositions which comprises the steps of:
   (a) forming a starch and water slurry containing up to about 43% starch by weight,
   (b) adding to the slurry an inorganic acid salt at a rate to provide up to about .3% of the acid salt based on the weight of dry starch in the slurry,
   (c) adding to the slurry hydrogen peroxide as an oxidizing agent at a rate to provide up to about .5% of the oxidizing agent based on the weight of dry starch in the slurry, said oxidizing agent being dispersible in the slurry,
   (d) passing the slurry to a heating zone, (e) heating the slurry in the heating zone to a temperature between about 250° F. and 320° F., to gelatinize the starch,
(f) passing the gelatinized starch to a reaction vessel and simultaneously reacting the gelatinized starch with the inorganic acid salt and the oxidizing agent, to effect a reduction in the viscosity of the gelatinized starch by acid hydrolysis and oxidation of the starch,
(g) flowing the gelatinized starch from the reaction vessel,
(h) adding to the flowing, gelatinized starch a masking agent to reduce retrogradation of the gelatinized starch,
(i) adding to the flowing, gelatinized starch a neutralization agent to raise the pH of the starch to about 7,
(j) flashing the gelatinized starch to the atmosphere,
(k) and collecting the gelatinized starch at a receiving zone.

21. The process of claim 20 in which the inorganic acid salt is aluminum chloride, the masking agent is sodium citrate, and the neutralization agent is a water-soluble alkali.

22. The process of claim 20 in which the inorganic acid salt is aluminum nitrate, the masking agent is sodium citrate, and the neutralization agent is a water-soluble alkali.

23. The process of claim 20 which includes the additional step of adjusting automatically the rate of flow of the gelatinized starch from the reaction vessel in step (g) in response to a differential pressure indicator located in the reaction vessel.

24. The process of claim 20 which includes the additional steps of measuring the viscosity of the gelatinized starch between steps (j) and (k), and adjusting automatically the rates and additions recited in steps (b), (c), (h), and (i) in response to the viscosity measurement.

References Cited

UNITED STATES PATENTS

| 2,503,053 | 4/1950 | Kerr | 127—38 |
| 3,211,564 | 10/1965 | Lauterbach | 106—214 |
| 3,356,531 | 12/1967 | Lanphere | 127—33 |

OTHER REFERENCES

C.A. 42; p. 3874a (1948).

MORRIS O. WOLK, Primary Examiner

S. MARANTZ, Assistant Examiner

U.S. Cl. X.R.

106—210, 214; 117—156, 165; 127—33, 70

PO-1050
(5/69)

UNITED STATES PATENT OFFICE
CERTIFICATE OF CORRECTION

Patent No. 3,475,215                 Dated    October 28, 1969

Inventor(s)         Hans W. Maurer

It is certified that error appears in the above-identified patent and that said Letters Patent are hereby corrected as shown below:

Column 1, lines 5 and 6, the assignee should appear as "Westvaco Corporation"; line 25, after "to" second instance delete the hyphen; line 50, for "is" read --in--. Column 2, line 56, for "action" read --cation--. Column 5, line 9, after "type" insert --and--; line 12, after "of" insert --a--; line 41, afte "in" insert --the conversion temperature and pressure results in--; line 71, for "Example 5" read --Example 4--. Column 8, line 12, for "axidizing" read --oxidizing--; line 57, for "to" read --of--.

SIGNED AND
SEALED
JUN 23 1970

(SEAL)
Attest:

Edward M. Fletcher, Jr.
Attesting Officer

WILLIAM E. SCHUYLER, JR.
Commissioner of Patents